US006328280B1

(12) United States Patent
Davidson

(10) Patent No.: US 6,328,280 B1
(45) Date of Patent: Dec. 11, 2001

(54) COMPRESSED GAS REGULATOR WITH TORQUE LIMITING ATTACHMENT KNOB

(76) Inventor: Gilbert Davidson, 9205 Huntcliff Trace, Atlanta, GA (US) 30350

(*) Notice: Subject to any disclaimer, the term of this patent is extended or adjusted under 35 U.S.C. 154(b) by 0 days.

(21) Appl. No.: 09/628,253

(22) Filed: Jul. 28, 2000

(51) Int. Cl.[7] .................................................. F16K 31/12

(52) U.S. Cl. .......................................... 251/148; 137/507

(58) Field of Search .................................. 251/148, 151, 251/144, 143; 137/505, 507

(56) References Cited

U.S. PATENT DOCUMENTS

| | | | | |
|---|---|---|---|---|
| D. 283,740 | * | 5/1986 | Wiesinger, II et al. | D29/6 |
| 3,147,761 | * | 9/1964 | Lecocq | 251/148 X |
| 5,509,407 | * | 4/1996 | Schuler | 137/505.25 X |
| 5,746,198 | * | 5/1998 | Taba et al. | 137/505.42 X |
| 5,775,368 | * | 7/1998 | Morino | 137/505.25 |
| 5,899,223 | * | 5/1999 | Schuman, Jr. | 251/148 X |
| 5,921,234 | * | 7/1999 | Garofalo | 128/201.28 |
| 6,082,396 | * | 7/2000 | Davidson | 137/505 X |
| 6,148,841 | * | 11/2000 | Davidson | 137/68.23 |

* cited by examiner

*Primary Examiner*—Kevin Shaver
*Assistant Examiner*—Eric Keasel
(74) *Attorney, Agent, or Firm*—Kyle S. Brant

(57) ABSTRACT

A compressed gas regulator for use in the medical, emergency and home health care fields is disclosed. The regulator includes a body having a rectangular aperture for receiving an industry standard post valve typically found on a high pressure gas tank. The regulator includes a mechanical attachment device for securing the regulator to the post valve. The mechanical attachment device, or knob, is cylindrical in cross-section and is hollow so that it may receive a portion of the regulator therein. The outer periphery of the knob includes a knurl pattern to aid in gripping the knob. The knob includes a threaded rod extending axially along the hollow interior of the knob. The threaded rod engages mating threads in a threaded aperture of the regulator body. Rotating the fastener urges the regulator into contact with the post valve, and a valve seat on the regulator provide a gas seal between the regulator and the post valve. The knob includes a torque limiting device that prevents over-tightening of the regulator on the tank, thereby preventing unintentional damage to the regulator.

20 Claims, 4 Drawing Sheets

COMPRESSED GAS REGULATOR WITH TORQUE LIMITING ATTACHMENT KNOB

FIELD OF THE INVENTION

This invention relates to gas flow control devices and, more particularly, to a compact, pressure regulated gas flow control valve.

BACKGROUND OF THE INVENTION

Precisely calibrated pressure reducing and gas-metering devices (regulators) are commonly used in the medical, emergency and home health care industries for delivering oxygen to patients in need thereof Most regulators are attached to a high pressure oxygen tank via standardized mechanical connections as set forth in the Compressed Gas Associations standards.

In the prior art, see FIG. 1, a "t-handle" is typically the mechanical fastener or attachment device of choice for securing the regulator to a "post valve". The post valve is attached to a high pressure gas tank. The post valve provides a convenient and reliable mechanical attachment mechanism for securing a regulator to a gas tank. Metered gas flow is usually delivered to the patient via a resilient flexible hollow tubing or hose. The tubing is attached to the regulator by forcing the tubing onto a tapered fitting having ridges thereon that aid in retaining the hose on the fitting.

It is not uncommon for the resilient tubing to become wrapped around or tangled on the t-handle of the regulator. Such tangling of the hose is very inconvenient to users of such devices. In an emergency scenario, precious time may be lost in providing gas to a patient as a medical assistant attempts to disentangle the tubing from the t-handle.

Further, service failures of regulators are, at times, attributable to over-tightening of the t-handle by the user. Such a failure requires return of the regulator to the manufacturer for repair.

What is needed is an attachment mechanism or fastener for securing a regulator to a high pressure gas tank that minimizes the likelihood of ensnaring resilient hoses or tubing typically used in the medical and home health care industry to deliver oxygen to a patient. Further, the fastener should limit the torque that a user may impart to the threaded rod or shaft of the fastener to prevent inadvertent damage to the regulator when attaching the regulator to a source of high pressure gas, be the source of high pressure gas a high pressure gas tank or a distributed high pressure gas system in a hospital.

SUMMARY OF THE INVENTION

A gas pressure regulator with torque limiting attachment device, according to one aspect of the present invention, comprises a body having a first aperture therethrough sized to receive a substantially rectangular pressure tank post valve, the body further including a mounting aperture having machining threads formed therein and in fluid communication with the first aperture, an inlet passage in fluid communication with the first aperture and an outlet passage in fluid communication with the inlet passage, regulator means disposed in the outlet passage for reducing gas pressure presented at the inlet passage, the regulator means supplying regulated gas pressure at the outlet passage, a threaded rod having a proximate end, a distal end and external threads formed on the lateral external surface thereof, the external threads mating with the machining threads of the mounting aperture, the proximate end of the rod being rotationally inserted into the mounting aperture of the body to secure the body to a pressure tank, a disk attached to the distal end of the threaded rod at the radial center of the disk, the rod extending perpendicularly from one surface of the disk, and a hollow cylindrical member having an open first end, an open second end, and having an internal diameter sized larger than the body, and wherein the first end of the cylindrical member is disposed over and around the body and the second end of the cylindrical member is attached to the disk.

A compressed gas pressure regulator device, according to another aspect of the present invention, comprises a body having a first aperture therethrough sized to receive a substantially rectangular pressure tank post valve, the body further including a mounting aperture having machining threads formed therein and in fluid communication with the first aperture, an inlet passage in fluid communication with the first aperture and an outlet passage in fluid communication with the inlet passage, regulator means disposed in the outlet passage for reducing gas pressure presented at the inlet passage, the regulator means supplying regulated gas pressure at the outlet passage, a threaded rod having a proximate end, a distal end and external threads formed on the lateral external surface thereof, the external threads mating with the machining threads of the mounting aperture, the proximate end of the rod being rotationally inserted into the mounting aperture of the body to secure the body to a pressure tank, a hollow cylindrical member having an open end and a closed end, and having an internal diameter sized larger than the body, and wherein the open end of the cylindrical member is disposed over and around the body, and means for limiting torque disposed between and attached to the distal end of the threaded rod and the cylindrical member, the means for limiting torque transmitting no more than a predetermined amount of tightening torque from the cylindrical member to the threaded rod.

One object of the present invention is to provide an improved compressed gas regulation device.

Another object of the present invention is to provide a compressed gas regulator device that minimizes the likelihood of entangling gas hoses and the like in the device.

Still another object of the present invention is to provide a compressed gas regulator device that includes a mechanism for limiting the tightening torque the user may apply when attaching the regulator to a source of compressed gas such as a pressure tank.

These and other object of the present invention will become more apparent from the following description of the preferred embodiments.

DESCRIPTION OF THE PREFERRED EMBODIMENT

Figure 1:
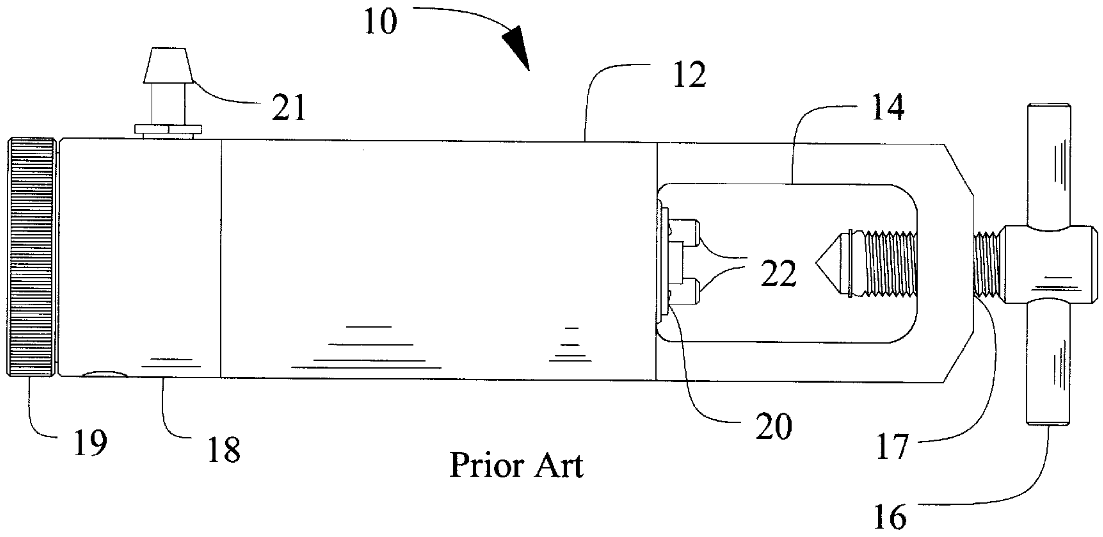
FIG. 1 is a front elevational view of a compressed gas regulator of the prior art.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a compressed gas regulator 10 according to the prior art is shown. Regulator 10 includes a body 12 having a yoke portion 14, a t-handle attachment device 16, and a flow meter portion 18. The flow meter portion 18 includes a flow adjustment knob 19. T-handle attachment device 16 is rotationally inserted into a threaded aperture 17 in yoke portion 14. Disposed internally within body 12 is a pressure regulator mechanism (not shown), well known in the art, that regulates gas pressure presented at valve seat 20. The pressure regulator mechanism supplies pressure regulated gas to the flow meter portion 18. Metered gas flow is supplied at hose fitting 15. Flow meter portion 18 of device 10 is detachable (as is described in more detail in my copending application entitled Compressed Gas Regulator With Flow Control and Internal Gauge, Ser. No. 09/213,441, Filed Dec. 18, 1998), and regulator 10 may be used merely as a gas pressure regulation device without gas flow metering functionality. Yoke portion 14 provides a mechanism for connection of regulator 10 to a standard CGA (Compressed Gas Association) 870 compressed gas tank connection. A CGA 870 tank connection (not shown) is a substantially rectangular post with a compressed gas fitting on a lateral surface thereof (see my copending application Ser. No. 09/349,924 entitled High Pressure Gas Valve for an example of a CGA 870 tank connection). The CGA 870 tank connection is aligned into position by dowel pins 22 so that valve seat 20 aligns with a mating compressed gas fitting on the CGA 870 connection device. Valve seat 20 is urged into contact with the CGA 870 connection when t-handle 16 is rotated, which forces the CGA 870 connection toward valve seat 20 to create a leak proof gas seal therebetween. Pressure regulated and flow metered gas is delivered at hose fitting 21.

Figure 2:
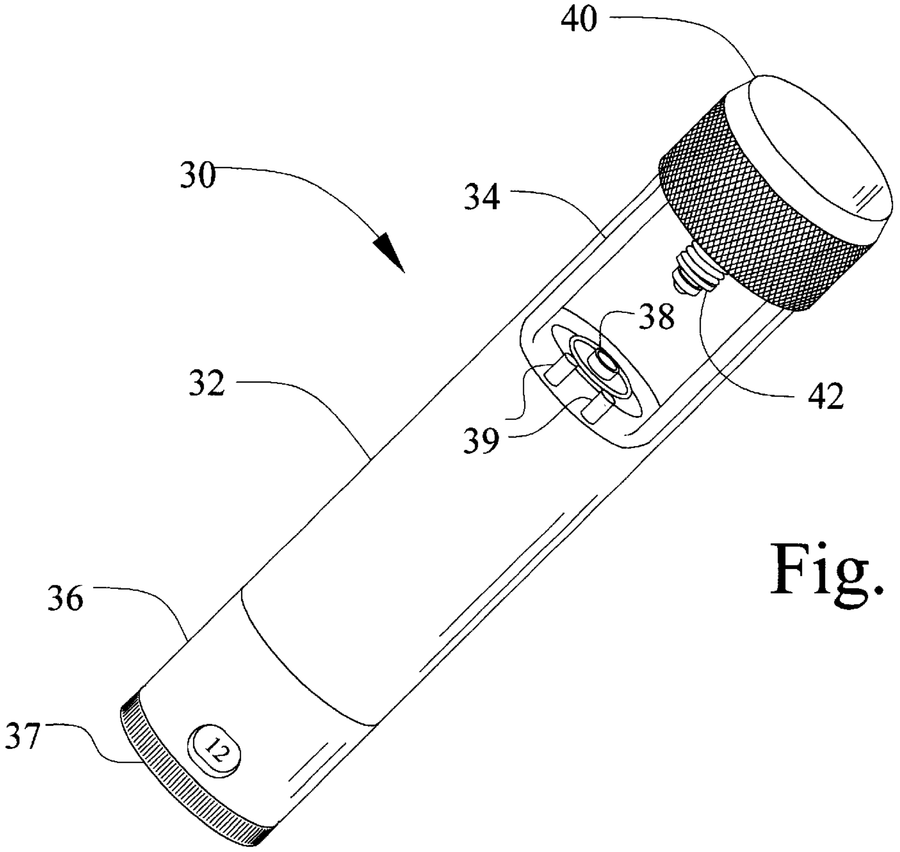
FIG. 2 is a perspective view of a compressed gas regulator having a torque limiting attachment knob according to the present invention.

Referring now to FIG. 2, a compressed gas regulator with torque limiting attachment knob 30, according to the present invention, is shown. Compressed gas regulator 30 is comprised of substantially the same components as found in device 10, including a body 32, a yoke portion 34 for receiving a CGA 870 connection, a flow meter portion 36 having a flow adjustment knob 37, dowel pins 39, and valve seat 38. Torque limiting attachment knob 40 replaces the t-handle of device 10 in this embodiment of the invention. Torque limiting knob 40 is attached to threaded rod 42, as is shown in subsequent FIGS. 5, 6 and 7. A hose fitting (not shown) identical in functionality to fitting 21 (FIG. 1) is attached to and extends outward from flow meter portion 36.

Figure 3:
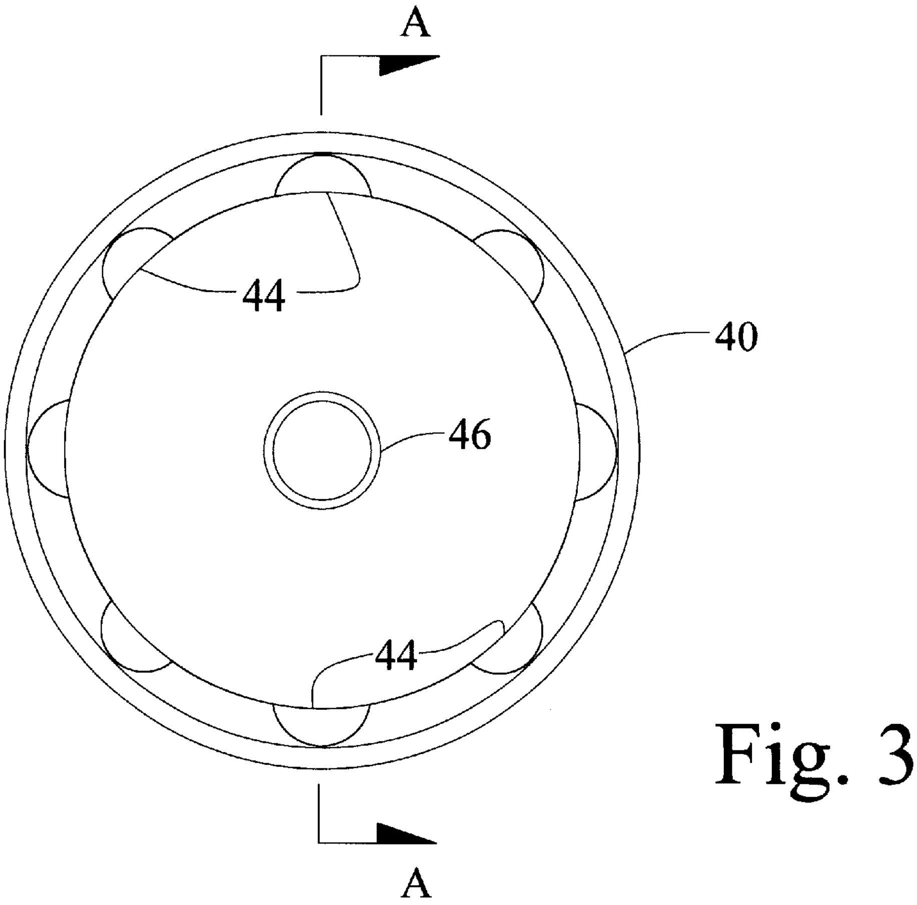
FIG. 3 is a front elevational view of the knob of FIG. 2.

Referring now to FIG. 3, an end view of torque limiting attachment knob 40 is shown. A plurality of semi-circular detents 44 are formed about the inner periphery of knob 40. Cylindrical aperture 46 receives threaded rod 42 (see FIGS. 2 and 7) therein. Though the detents 44 are depicted as semi-circular in cross-section, it is contemplated that other geometric shapes, such as triangular, square, hexagonal, etc., are feasible alternatives to the semi-circular detents shown in FIG. 3. Knob 40 is made of brass, anodized aluminum, steel, plastic or other suitable materials well known in the art. Preferably, aluminum is used in the construction of knob 40 to reduce the overall weight of device 30.

Figure 4:
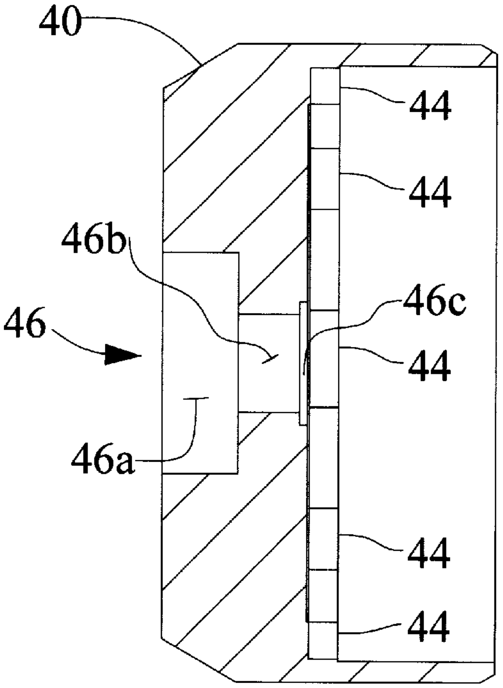
FIG. 4 is a cross-sectional side view of the dome knob of FIG. 3 looking the direction of the arrows labeled A.

Referring now to FIG. 4, a cross-sectional view of knob 40 of FIG. 3, looking in the direction of the arrows labeled A, is shown. Knob 40 is cylindrical in cross-section. Detents 44 are formed on the inner periphery of knob 44. Aperture 46 includes three distinct diameters at *46a*, *46b* and *46c*. The larger diameter of aperture 46, at *46a*, provides a countersunk shoulder or ridge into which nut 48 (shown in FIG. 7) is disposed. Likewise, a shoulder is formed at location *46c* by the larger diameter of aperture 46 at *46c*, providing a surface against which threaded rod 42 rests. The diameter of aperture 46 at *46b* is sized just large enough for threaded rod 42 to freely rotate when rod 42 is disposed therein.

Figure 5:
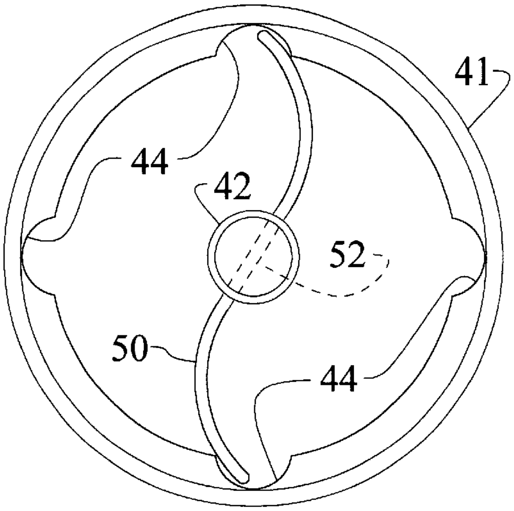
FIG. 5 is a front elevational view of the dome knob assembly of FIG. 2.
Figure 6:
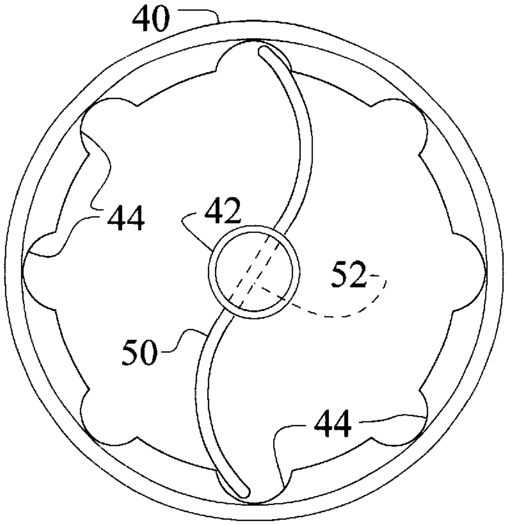
FIG. 6 is a front elevational view of another embodiment of the dome knob of FIG. 5.

Referring now to FIGS. 5 and 6, two different embodiments of a torque limiting attachment device, according to the present invention, are shown. In FIG. 5, knob 41 includes a lesser quantity of detents 44 versus knob 40 of FIG. 6. Depending upon the manufacturing technique employed, it is more likely that knob 41 would be less expensive to manufacture as less machining would be required to produce a smaller quantity of detents 44. Also shown in FIGS. 5 and 6 is resilient rod 50. Rod 50 is made of spring steel, stainless steel, beryllium copper, resilient plastic, graphite composite or a suitable substitute therefor. Rod 50 is inserted through a transverse aperture 52 (shown in FIGS. 7 and 8) in threaded rod 42 before threaded rod 42 is attached to knob 40 or 41. Rod 50 is deformed into a semi-circular form at its distal ends when threaded rod 42 is inserted into and attached to knob 40 or 41. Rod 50 has an overall length greater than the inner diameter, measured at opposing detents 44, of knobs 40 or 41.

Figure 7:
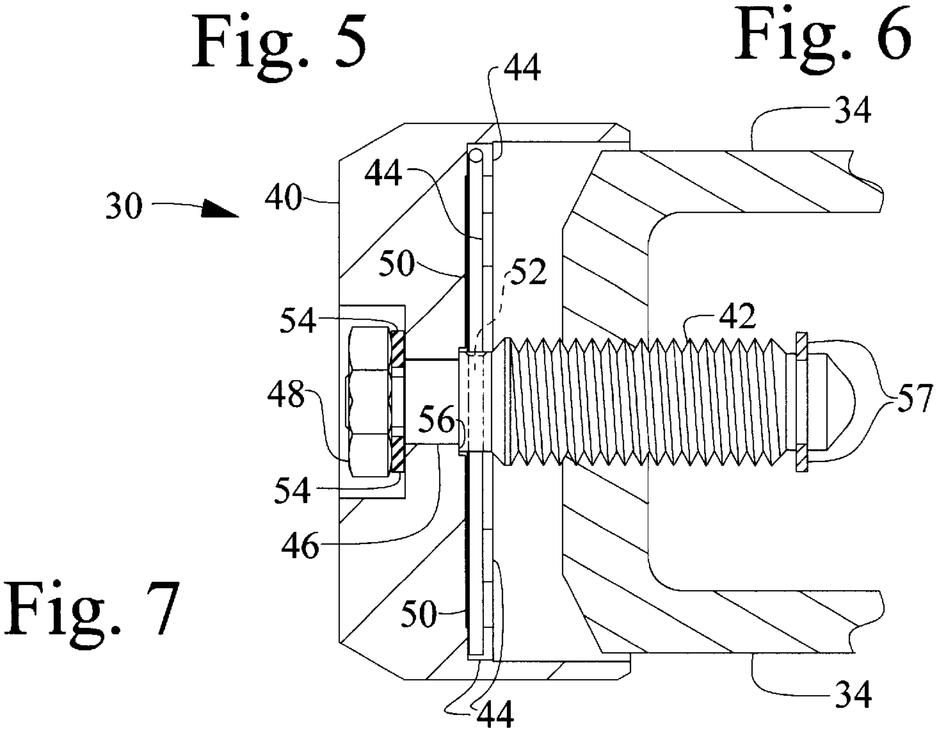
FIG. 7 is a partial cross-sectional view of the dome knob of FIG. 5 shown attached to a regulator body.

Referring now to FIG. 7, a more detailed partial cross-sectional view of the compressed gas regulator with torque limiting attachment device 30 is shown. Resilient rod 50 is inserted through aperture 52 in threaded rod 42. Rod 50 is resiliently bent at its distal ends so that rod 50 and threaded rod 42 may be disposed within knob 40 as shown. The distal ends of rod 50 engage detents 44. Threaded rod 42 is inserted through aperture 46 and attached to knob 40 by nut 48. Slip washer 54 is placed between knob 40 and nut 48 to enable knob 40 to rotate with respect to threaded rod 42 when the rotational force imparted to knob 40 exceeds the surface friction between slip washer 54 and knob 40. Slip washer 54 is preferably made from nylon, plastic, aluminum or steel. Shoulder 56 of threaded rod 42 abuts knob 40 when rod 42 is inserted into aperture 46 of knob 40. A c-clip 57 is snapped onto threaded rod 42 to retain threaded rod on yoke 34.

Figure 8:
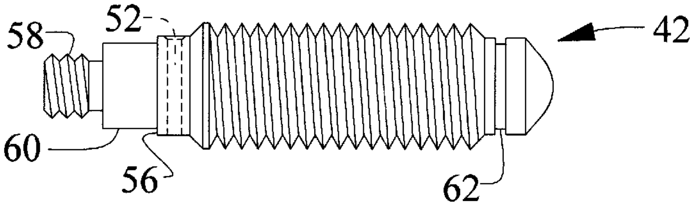
FIG. 8 is a front elevational view of the threaded stem shown in FIGS. 5 and 6.

Referring now to FIG. 8, threaded rod 42 is shown in more detail. Rod 42 includes a transverse through hole or aperture 52. Rod 50 is received into aperture 52. Shoulder 56 is formed with a diameter larger than aperture 46 in knob 40 so that threaded rod 42 will abut knob 40. Threaded end 58 includes threads that mate with nut 48 so that threaded rod 42 may be secured to knob 40 by nut 48. The length of barrel portion 60 is slightly longer in dimension than the length of aperture 46*b* (see FIG. 4) in knob 40. Slot 62 receives retaining c-clip 57 (see FIG. 7) so that threaded rod 42 cannot be removed from yoke 34.

Operationally speaking, when a user rotates knob 40 to attach regulator 30 onto a compressed gas tank, a rotational force is imparted to threaded rod 42 by resilient rod 50 when rod 50 engages detents 44. When knob 40 is rotated to tighten device 30 onto the gas tank, rod 50 interacts with detents 44 to prevent excessive torque from being transmitted from knob 40 to threaded rod 42. The lateral surface of rod 50 will disengage detents 44 when the rotational force on knob 40 overcomes the frictional forces between the lateral surface of rod 50 and detents 44, at which time rod 50 is resiliently deformed inwardly and the lateral surfaces at the distal ends thereof slide along the inner periphery of knob 40 between detents 44. When knob 40 is rotated in the opposing direction, i.e. to remove threaded rod 42 from contact with a post valve, the semi-circular deformation of rod 50 causes the distal ends thereof to contact or "bite into" detents 44 at a near right angle so that the rotational torque imparted to threaded rod 42 is higher when knob 40 is rotated to disconnect regulator 30 from a post valve. The sharper the distal ends of rod 50, the higher the torque transmitted from knob 40 through resilient rod 50 to threaded rod 42 during the regulator disengagement process.

Figure 9:
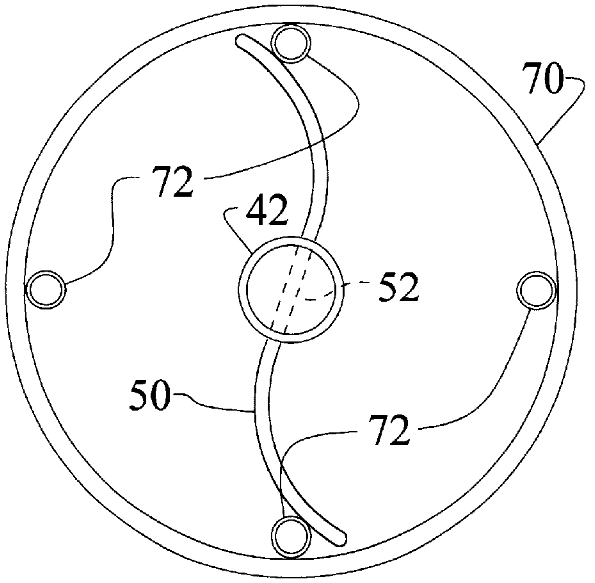
FIG. 9 is a front elevational view of another embodiment of a dome knob with torque limiting features according to the present invention.
Figure 10:
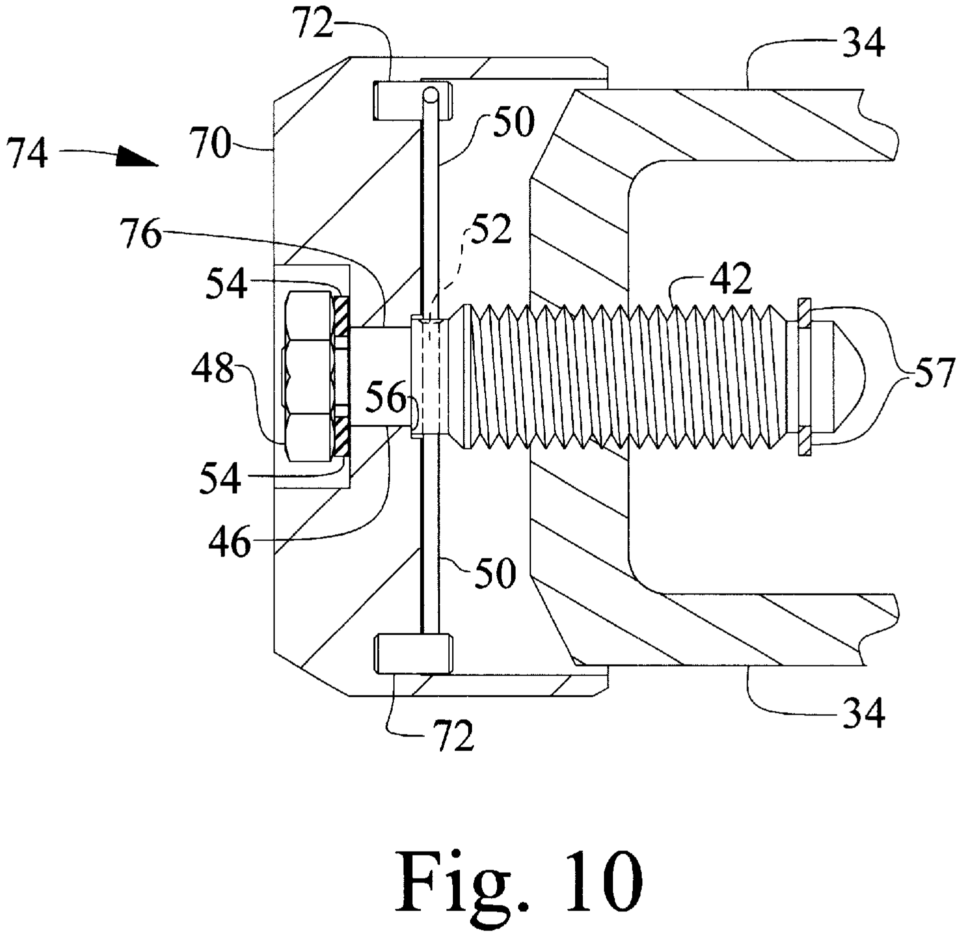
FIG. 10 is a partial cross-sectional view of the dome knob of FIG. 9 shown attached to a regulator body.

Referring now to FIGS. 9 and 10, another embodiment of a compressed gas regulator with torque limiting attachment knob 70, according to the present invention, is shown. In FIG. 9, resilient rod 50 is disposed in aperture 52 of threaded rod 42 prior to the attachment of threaded rod 42 to knob 70. Rod 50 is deformed into a semi-circular form at its distal ends when threaded rod 42 is inserted into and attached to knob 70. Rod 50 is sized so that it must be slightly deformed to fit within knob 70. Four dowel pins 72 are disposed about the inner periphery of knob 70 and mechanically interact with rod 42. Dowel pins 72 are sized so that they may be "press fit" into cylindrical apertures formed in knob 70.

In FIG. 10, compressed gas regulator 74 is shown with torque limiting knob 40 attached to a regulator body 32. The regulator 74 is comprised of substantially the same components as found in device 30, and like number components are identical in function and form. Items and features depicted in FIG. 10 include yoke portion 34, threaded rod 42, nut 48, resilient rod 50, transverse aperture 52, washer 54, shoulder 56, c-clip 57, knob 70, and dowel pins 72.

Knob 70 is constructed of the same materials as knob 40. Dowel pins 72 are preferably made from high carbon or stainless steel.

Operationally, the device shown in FIGS. 9 and 10 operates to limit rotational torque applied to threaded rod 42 when threaded rod 42 is advanced into yoke portion 34. When rotational tightening forces applied to knob 70 exceed the static frictional surface forces that exist between rod 50 and dowel pins 72, resilient deformation of rod 50 will then take place as rod 50 is rotated over and past dowel pins 72. Thus, a torque limit is established to prevent "over-tightening" of knob 70 when regulator 74 is attached to a source of high pressure, such as a post valve (not shown) well known in the art.

It is contemplated that a circular cross-section semi-circular snap-ring (not shown) may be used to attach threaded rod 42 to knob 70 by forming opposing u-shaped channels in the adjoining cylindrical surfaces, at location 76 in FIG. 10, between rod 42 and knob 70 to receive the snap-ring therebetween. Such a snap-ring would allow rotation of knob 70 with respect to threaded rod 42 and eliminate the need for nut 48 and washer 54, and the added machining step of forming an aperture in knob 70 within which nut 48 is disposed.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A gas pressure regulator device comprising:

a body having a first aperture therethrough sized to receive a substantially rectangular pressure tank post valve, said body further including a mounting aperture having machining threads formed therein and in fluid communication with said first aperture, an inlet passage in fluid communication with said first aperture and an outlet passage in fluid communication with said inlet passage;

regulator means disposed in said outlet passage for reducing gas pressure presented at said inlet passage, said regulator means supplying regulated gas pressure at said outlet passage;

a threaded rod having a proximate end, a distal end and external threads formed on the lateral external surface thereof, said external threads mating with said machining threads of said mounting aperture, said proximate end of said rod being rotationally inserted into said mounting aperture of said body to secure said body to a pressure tank;

a disk attached to said distal end of said threaded rod at the radial center of said disk, said rod extending perpendicularly from one surface of said disk; and a hollow cylindrical member having an open first end, an open second end, and having an internal diameter sized larger than said body, and wherein said first end of said cylindrical member is disposed over and around said body and said second end of said cylindrical member is attached to said disk.

2. The device of claim 1 wherein said cylindrical member includes a knurl surface finish on the lateral surface of said cylindrical member.

3. The device of claim 1 including flow meter means attached to said body, said flow meter means having a flow inlet in fluid communication with said outlet passage of said body, said flow meter means further including a flow outlet where said flow meter means delivers a predetermined volumetric flow of gas per unit time.

4. The device of claim 3 wherein said cylindrical member includes a knurl surface finish on the lateral surface of said cylindrical member.

5. The device of claim 4 wherein said first aperture of said body conforms in size with accepted industry standards for gas regulator devices and is sized to receive a standardized post valve.

6. A gas pressure regulator device comprising:

a body having a first aperture therethrough sized to receive a substantially rectangular pressure tank post valve, said body further including a mounting aperture having machining threads formed therein and in fluid communication with said first aperture, an inlet passage in fluid communication with said first aperture and an outlet passage in fluid communication with said inlet passage;

regulator means disposed in said outlet passage for reducing gas pressure presented at said inlet passage, said regulator means supplying regulated gas pressure at said outlet passage;

a threaded rod having a proximate end, a distal end and external threads formed on the lateral external surface thereof, said external threads mating with said machining threads of said mounting aperture, said proximate end of said rod being rotationally inserted into said mounting aperture of said body to secure said body to a pressure tank post valve, said rod further including a transverse aperture near said distal end thereof;

a resilient rod disposed in said transverse aperture of said threaded rod;

a hollow substantially cylindrical member having an open end and a closed end, said cylindrical member having an internal diameter substantially corresponding to the length of said resilient rod, said cylindrical member including a plurality of detents arranged about the inner periphery of said cylindrical member, and wherein said open end of said cylindrical member is disposed over said threaded rod so that said resilient rod engages at least one of said plurality of detents, and wherein said closed end of said cylindrical member is rotatably attached to said distal end of said threaded rod.

7. The device of claim 6 wherein the length of said resilient rod is greater than the internal diameter of said substantially hollow cylindrical member.

8. The device of claim 7 wherein said resilient rod engages at least two of said plurality of detents.

9. The device of claim 8 including means for metering gas flow attached to said body and in fluid communication with said outlet passage of said body, said means for metering gas flow providing a metered flow of pressurized gas at a flow meter outlet aperture.

10. A gas pressure regulator device comprising:

a body having a first aperture therethrough sized to receive a substantially rectangular pressure tank post valve, said body further including a mounting aperture having machining threads formed therein and in fluid communication with said first aperture, an inlet passage in fluid communication with said first aperture and an outlet passage in fluid communication with said inlet passage;

regulator means disposed in said outlet passage for reducing gas pressure presented at said inlet passage, said regulator means supplying regulated gas pressure at said outlet passage;

a threaded rod having a proximate end, a distal end and external threads formed on the lateral external surface thereof, said external threads mating with said machining threads of said mounting aperture, said proximate end of said rod being rotationally inserted into said mounting aperture of said body to secure said body to a pressure tank;

a hollow cylindrical member having an open end and a closed end, and having an internal diameter sized larger than said body, and wherein said open end of said cylindrical member is disposed over and around said body; and means for limiting torque disposed between and attached to said distal end of said threaded rod and said cylindrical member, said means for limiting torque transmitting no more than a predetermined amount of tightening torque from said cylindrical member to said threaded rod.

11. The device of claim 10 wherein said means for limiting torque provides a first torque limit between said cylindrical member and said threaded rod when said cylindrical member is rotated so as to remove said threaded rod from within said mounting aperture, and said means for limiting torque providing a second torque limit between said cylindrical member and said threaded rod when said cylindrical member is rotated so as to advance said threaded rod into said mounting aperture, and wherein said first torque limit is greater than said second torque limit.

12. The device of claim 11 wherein said means for limiting torque includes a plurality of detents formed in and situated about the inner periphery of said cylindrical member, a first resilient protrusion attached to and extending radially outward from said threaded rod, said first resilient protrusion engaging one of said plurality of detents, and wherein said closed end of said cylindrical member is freely rotatably attached to the distal end of said threaded rod.

13. The device of claim 12 including a second resilient protrusion attached to and extending radially outward from said threaded rod and engaging one of said plurality of detents.

14. The device of claim 13 wherein said threaded rod includes a transverse aperture located near the distal end of said threaded rod, and wherein said first and second resilient protrusions are portions of a resilient rod disposed in said transverse aperture of said threaded rod.

15. The device of claim 14 wherein the length of said resilient rod is larger than the inner diameter of said cylindrical member.

16. The device of claim 15 wherein said closed end of said cylindrical member includes an aperture centrally located therein, said threaded rod including a shoulder extending radially outward therefrom near said distal end of said threaded rod, wherein the diameter of said shoulder is sized larger than the diameter of said aperture in said closed end of said cylindrical member, and wherein said cylindrical member receives said threaded rod in said aperture of said closed end and abuts said shoulder, and further including a fastener that rotatably attaches said cylindrical member to said threaded rod with said shoulder abutting said cylindrical member.

17. The device of claim 11 wherein said means for limiting torque includes a plurality of protrusions situated at a fixed radius about and extending inwardly from the inner surface of said cylindrical member, and a resilient rod disposed in a transverse aperture in said threaded rod and extending radially outward from said threaded rod, said resilient rod engaging at least two of said plurality of protrusions, and wherein said closed end of said cylindrical member is freely rotatably attached to the distal end of said threaded rod.

18. The device of claim 17 wherein said plurality of protrusions are dowel pins, and wherein said dowel pins are press-fit into a plurality of apertures formed about the inner periphery of said cylindrical member.

19. The device of claim 18 wherein the length of said resilient rod is larger than the inner diameter of said cylindrical member.

20. The device of claim 19 wherein said closed end of said cylindrical member includes an aperture centrally located therein, said threaded rod includes a shoulder extending radially outward therefrom near said distal end of said threaded rod, wherein the diameter of said shoulder is sized larger than the diameter of said aperture in said closed end of said cylindrical member, and wherein said cylindrical member receives said threaded rod in said aperture of said closed end and abuts said shoulder, and further including a fastener that rotatably attaches said cylindrical member to said threaded rod with said shoulder abutting said closed end of said cylindrical member.

* * * * *